(12) United States Patent  
Miyazawa et al.

(10) Patent No.: US 11,671,607 B2  
(45) Date of Patent: Jun. 6, 2023

(54) IMAGE TRANSMISSION DEVICE, IMAGE RECEPTION DEVICE AND COMPUTER READABLE MEDIUM

(71) Applicant: Mitsubishi Electric Corporation, Tokyo (JP)

(72) Inventors: Jin Miyazawa, Tokyo (JP); Shinya Hirakuri, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/634,241

(22) PCT Filed: Aug. 23, 2019

(86) PCT No.: PCT/JP2019/033014  
§ 371 (c)(1),  
(2) Date: Feb. 10, 2022

(87) PCT Pub. No.: WO2021/038625  
PCT Pub. Date: Mar. 4, 2021

(65) Prior Publication Data  
US 2022/0377351 A1 Nov. 24, 2022

(51) Int. Cl.  
*H04N 19/166* (2014.01)  
*H04N 19/182* (2014.01)

(52) U.S. Cl.  
CPC ......... *H04N 19/166* (2014.11); *H04N 19/182* (2014.11)

(58) Field of Classification Search  
USPC .................................................. 375/240.02  
See application file for complete search history.

(56) References Cited

U.S. PATENT DOCUMENTS

| 4,815,078 A | 3/1989 | Shimura |
| 5,086,489 A | 2/1992 | Shimura |
| (Continued) | | |

FOREIGN PATENT DOCUMENTS

| JP | S62-231569 A | 10/1987 |
| JP | 2-280462 A | 11/1990 |
| (Continued) | | |

OTHER PUBLICATIONS

International Search Report dated Oct. 15, 2019, received for PCT Application PCT/JP2019/033014, Filed on Aug. 23, 2019, 5 pages including English Translation.

(Continued)

*Primary Examiner* — Behrooz M Senfi  
(74) *Attorney, Agent, or Firm* — Xsensus LLP (57) ABSTRACT

An image transmission device (100) includes a compression unit (16) to generate first compression images (5) which are obtained by irreversibly compressing divided images, and to generate second compression images (6) which are obtained by reversibly compressing each of the first compression images (5), a decompression unit (17) to decompress each of the first compression images (5) as decompression images (7), a division sum image generation unit (12) to generate a division sum image (imgSUM), an error sum image generation unit (13) to generate an error sum image (ΔimgSUM), a judgment unit (14) to generate judgment data (Dj), and a transmission unit (15) to transmit the second compression images (6), the division sum image (imgSUM), the error sum image (ΔimgSUM) and the judgment data (Dj).

8 Claims, 9 Drawing Sheets

(56) References Cited

U.S. PATENT DOCUMENTS

| | | | |
|---|---|---|---|
| 5,151,795 A | 9/1992 | Adachi | |
| 5,481,553 A | 1/1996 | Suzuki et al. | |
| 5,515,388 A | 5/1996 | Yagasaki | |
| 5,590,139 A | 12/1996 | Suzuki et al. | |
| 5,870,412 A | 2/1999 | Schuster et al. | |
| 6,108,379 A | 8/2000 | Shikakura et al. | |
| 2003/0113026 A1 | 6/2003 | Srinivasan et al. | |
| 2015/0003751 A1 | 1/2015 | Aiba | |
| 2017/0365070 A1* | 12/2017 | Togo | G06T 9/001 |
| 2018/0098069 A1 | 4/2018 | Ueki et al. | |

FOREIGN PATENT DOCUMENTS

| | | | | |
|---|---|---|---|---|
| JP | 3-72779 A | | 3/1991 | |
| JP | 9-186990 A | | 7/1997 | |
| JP | 2000-20406 A | | 1/2000 | |
| JP | 2001-292451 A | | 10/2001 | |
| JP | 2011228936 A | * | 11/2011 | H04N 7/15 |
| JP | 2013-25560 A | | 2/2013 | |
| JP | 2015-12483 A | | 1/2015 | |
| JP | 2017-228903 A | | 12/2017 | |
| JP | 2018-136735 A | | 8/2018 | |
| WO | 2016/147836 A1 | | 9/2016 | |
| WO | WO-2021039098 A1 | * | 3/2021 | H04L 25/49 |
| WO | WO-2021126505 A1 | * | 6/2021 | H04N 19/597 |

OTHER PUBLICATIONS

Extended European search report dated Aug. 4, 2022, in corresponding European patent Application No. 19943462.2, 9 pages.

* cited by examiner

IMAGE TRANSMISSION DEVICE, IMAGE RECEPTION DEVICE AND COMPUTER READABLE MEDIUM

CROSS-REFERENCE TO RELATED APPLICATION

The present application is based on PCT filing PCT/JP2019/033014, filed Aug. 23, 2019, the entire contents of which are incorporated herein by reference.

TECHNICAL FIELD

The present invention relates to an image transmission device, an image reception device, an image transmission program and an image reception program.

BACKGROUND ART

There is a system to compress on an artificial satellite and transmit to the earth large-volume image data requiring high-speed transmission, such as a satellite image, and to decompress the compressed image on the ground. In such a system, there is a case wherein an error occurs in the decompressed image which has been decompressed on the ground. As for an error in a decompressed image, according to a conventional technology, there exists a technique to suppress fluctuation in image quality associated with packet losses (for example, Patent Literature 1). However, since an original image is restored by interpolation according to the conventional technology, there is a problem in quality of the original image restored.

Further, as a countermeasure for an error due to radiation in outer space being one of occurrence factors of the above-mentioned image error, a technique to determine output by majority decision by using equal to or more than three same devices is widely used. However, according to this technique, there is a problem that a device scale is increased.

CITATION LIST

Patent Literature

Patent Literature 1: JP2017-228903 A

SUMMARY OF INVENTION

Technical Problem

The present invention is aimed at providing a device to transmit, when an error occurs in a decompressed image that has been decompressed, data which makes it possible to obtain a restored image equivalent to a decompressed image at the time when an error does not occur.

Solution to Problem

There is provided according to one aspect of the present invention, an image transmission device includes:

a compression unit to generate a first compression image by irreversibly compressing each divided image of a plurality of divided images obtained by dividing an image, and to generate a second compression image by reversibly compressing the first compression image;

a decompression unit to decompress either one of the first compression image and the second compression image, as a decompression image;

a first generation unit to aggregate a pixel value at a same pixel position in the divided image, and to generate a division sum image including a pixel value aggregated for the same pixel position;

a second generation unit to generate, for the decompression image, an error image indicating a compression error of the decompression image relative to the divided image, to aggregate a pixel value at a same pixel position in the error image, and to generate an error sum image including the pixel value aggregated for the same pixel position;

a judgment unit to judge whether the compression error indicated by the error image exceeds a tolerable value, and to generate judgment data indicating a judgment result, and a transmission unit to transmit the second compression image for the divided image, the division sum image, the error sum image and the judgment data.

Advantageous Effects of Invention

According to an image transmission device of the present invention, when an error occurs in a decompression image that has been decompressed, it is possible to provide a device to transmit data which makes it possible to obtain a restoration image equivalent to a decompression image at the time when an error does not occur.

DESCRIPTION OF EMBODIMENTS

Hereinafter, embodiments of the present invention will be described by using diagrams. In each diagram, same or corresponding elements are denoted by same reference numerals. In explanation of the embodiments, description for the same or corresponding elements will be omitted or simplified appropriately.

First Embodiment

With reference to FIG. 1 through FIG. 5, an explanation will be provided of the image transmission device 100 and the image reception device 200 of the first embodiment.

Figure 1:
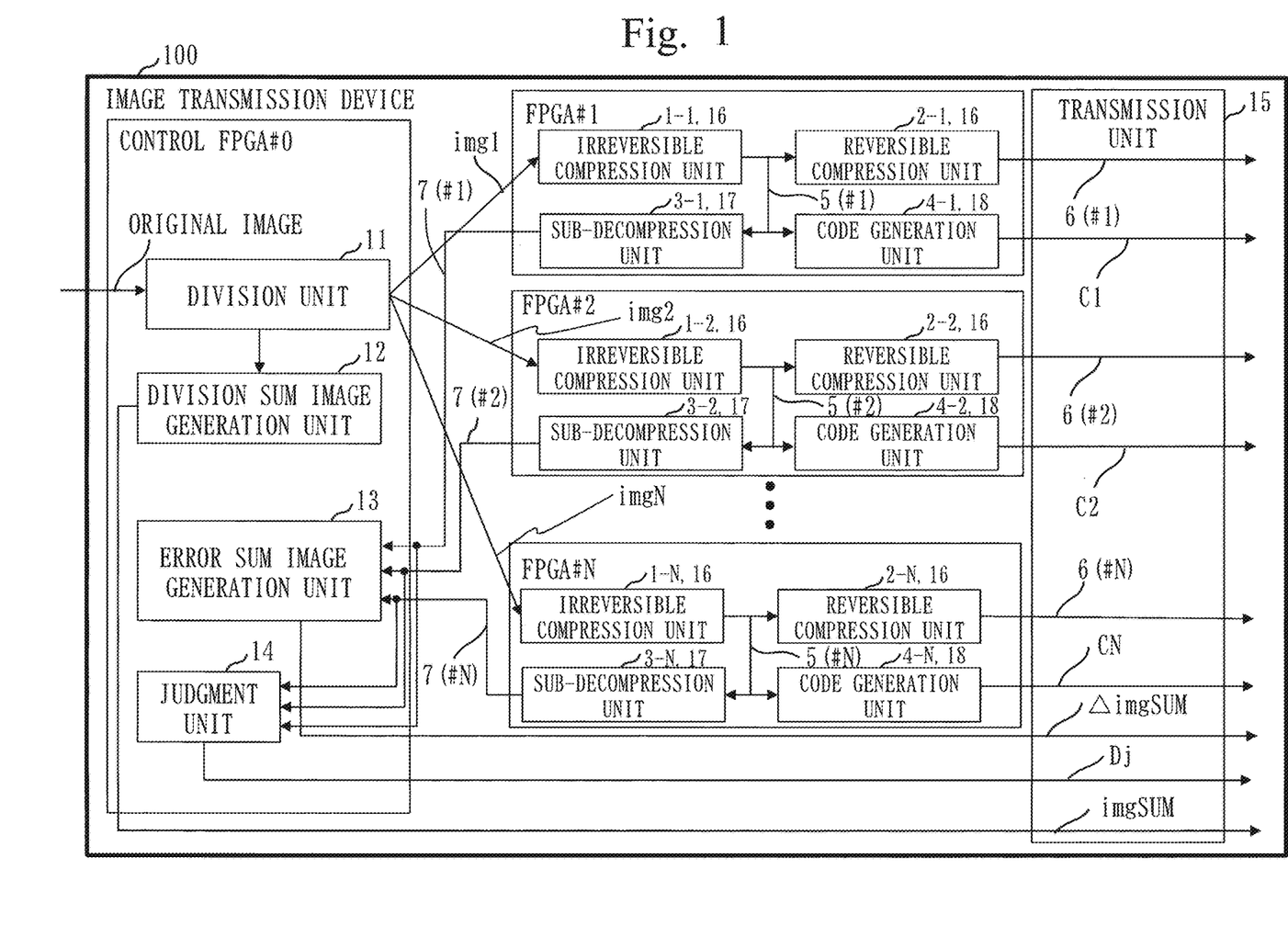
FIG. 1 is a diagram of a first embodiment, and is a diagram illustrating a hardware configuration of an image transmission device 100.

FIG. 1 illustrates a hardware configuration of the image transmission device 100.

Figure 2:
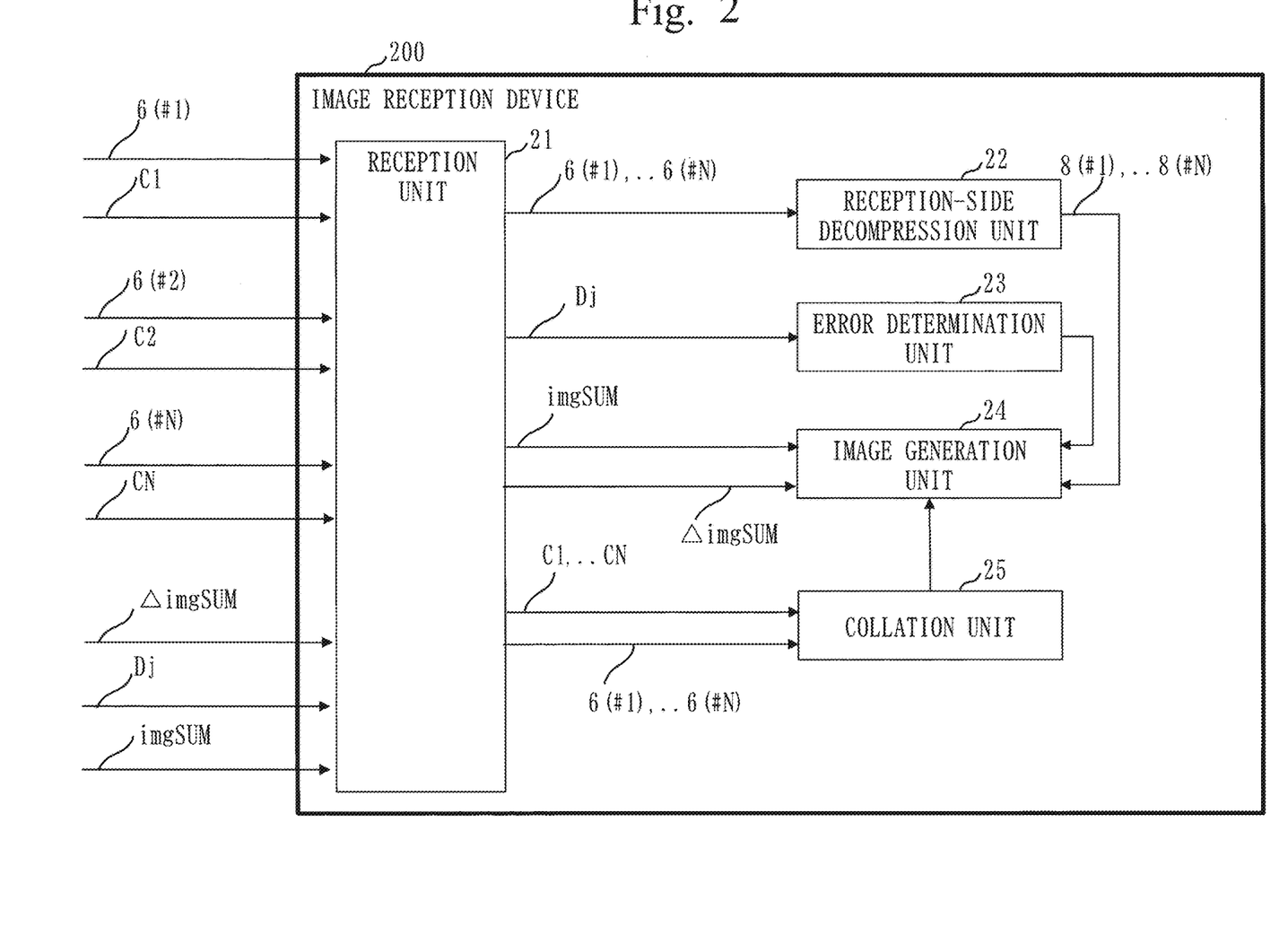
FIG. 2 is a diagram of the first embodiment, and is a diagram illustrating a functional configuration of an image reception device 200.

FIG. 2 illustrates a functional configuration of the image reception device 200.

Figure 3:
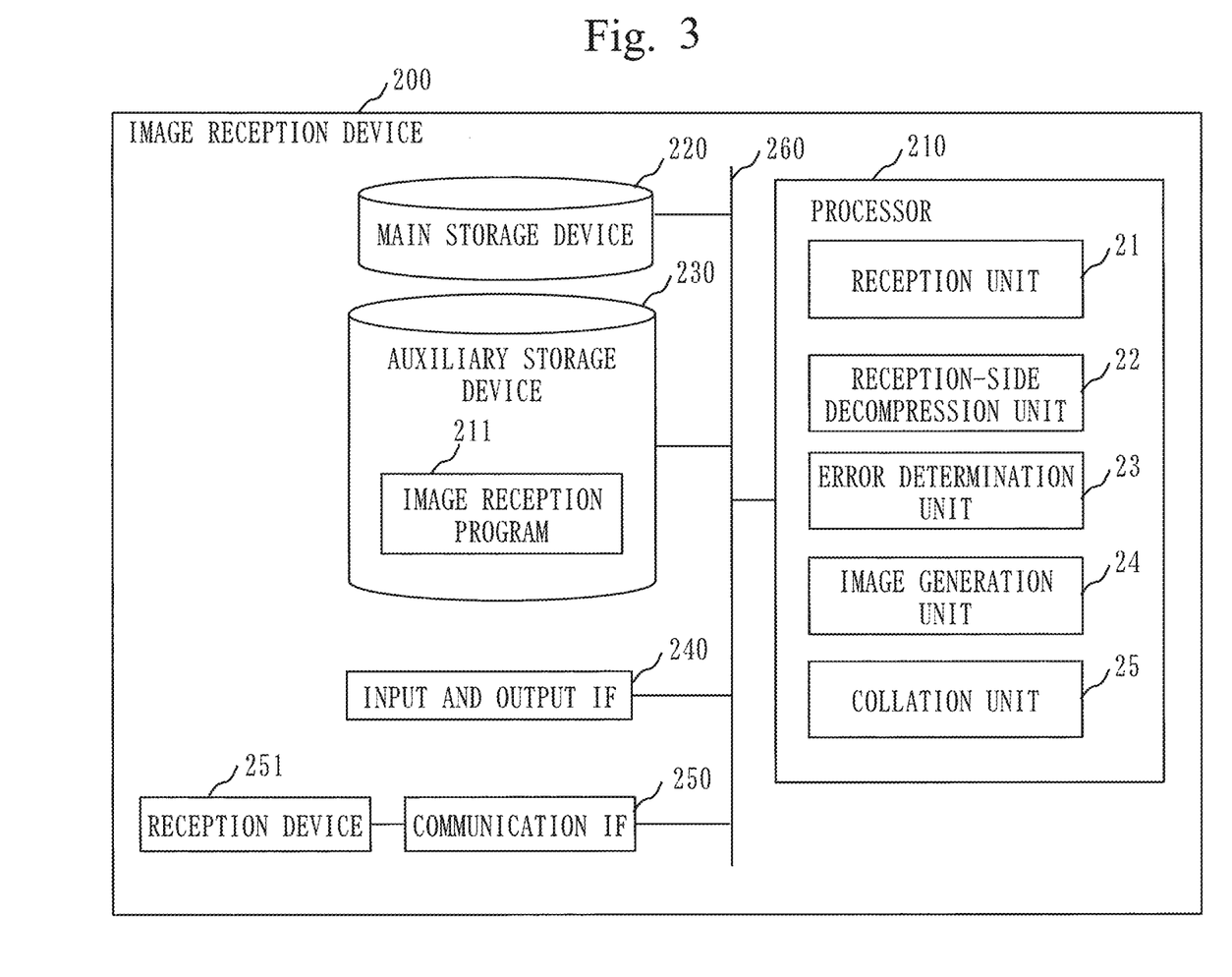
FIG. 3 is a diagram of the first embodiment, and is a diagram illustrating a hardware configuration of the image reception device 200.

FIG. 3 illustrates a hardware configuration of the image reception device 200.

*Explanation of Configuration*

With reference to FIG. 1, the hardware configuration of the image transmission device 100 will be described. An FPGA in the following explanation is an abbreviation for "field-programmable gate array." The image transmission device 100 includes a control FPGA #0, N-pieces of FPGAs from an FPGA #1 through an FPGA #N, and a transmission unit 15. The transmission unit 15 is a transmission device.

The image transmission device 100 is supposed to be mounted on a spacecraft such as an artificial satellite or a probe. Considering usage in a space, there are FPGAs with high radiation resistivity and low radiation resistivity. Generally, an FPGA with high radiation resistivity is low in processing performance. On the other hand, an FPGA with low radiation resistivity is higher in processing performance than an FPGA with high radiation resistivity. Since the volume of images handled by the image transmission device 100 is large, it is necessary to perform compression processing in parallel by a plurality of FPGAs. When compression processing is performed in parallel by a plurality of FPGAs high in radiation resistivity and low in processing performance, the parallel number is increased, and a problem relating to a hardware resource is occurred. On the other hand, when compression processing is performed in parallel by a plurality of FPGAs low in radiation resistivity and high in processing performance, the parallel number is decreased, and it is possible to reduce a hardware resource. However, due to an error by radioactive rays such as single event upset (SEU) or single event functional interrupt (SEFI), probability of an error to occur in a decompressed image is raised. The occurrence frequency of errors is considered to be a degree to which an error occurs in one FPGA at most in one imaging. Thus, in compression processing in parallel, a plurality of FPGAs low in radiation resistivity and high in processing performance are used. On the other hand, in processing other than compression processing in parallel, which does not require much throughput, an FPGA high in radiation resistivity and low in processing performance is used.

According to the above-mentioned view, the control FPGA #0 is high in radiation resistivity and low in processing performance. The FPGA #1 through the FPGA #N are low in radiation resistivity and high in processing performance. The FPGA #1 through the FPGA #N may be denoted by FPGAs #K (K=1, 2, . . . N). An FPGA #K includes an irreversible compression unit 1-K, a reversible compression unit 2-K, a sub-decompression unit 3-K and a sub-code generation unit 4-K. Further, the control FPGA #0 includes a division unit 11, a division sum image generation unit 12, an error sum image generation unit 13 and a judgment unit 14. The division sum image generation unit 12 is a first generation unit, and the error sum image generation unit 13 is a second generation unit. Each function of the control FPGA #0, and the FPGA #1 through the FPGA #N will be described in descriptions of operations.

With reference to FIG. 2 and FIG. 3, the configuration of the image reception device 200 will be described. The image reception device 200 is arranged in a ground station on the earth. As illustrated in FIG. 2, the image reception device 200 includes, as functional elements, a reception unit 21, a reception-side decompression unit 22, an error determination unit 23, an image generation unit 24 and a collation unit 25.

As illustrated in FIG. 3, the image reception device 200 is a computer. The image reception device 200 includes a processor 210. In addition to the processor 210, the image reception device 200 includes other hardware components such as a main storage device 220, an auxiliary storage device 230, an input and output IF 240 and a communication IF 250. IF is an abbreviation for Interface. The processor 210 is connected to other hardware components via a signal line 260, to control other hardware components.

The functions of the reception unit 21, the reception-side decompression unit 22, the error determination unit 23, the image generation unit 24 and the collation unit 25 are realized by an image reception program 211 stored in the auxiliary storage device 230. The image reception program 211 is a program to realize the functions of the reception unit 21, the reception-side decompression unit 22, the error determination unit 23, the image generation unit 24 and the collation unit 25.

The processor 210 executes the image reception program 211. The processor 210 is an integrated circuit (IC) to perform arithmetic processing. Specific examples of the processor 210 are a central processing unit (CPU), a digital signal processor (DSP) and a graphics processing unit (GPU).

The input and output IF 240 is a port through which data is input and output from each device. The communication IF 250 is a communication port whereby a processor communicates with other devices. A reception device 251 is connected to the communication IF 250. By using the communication IF 250 and the reception device 251, the reception unit 21 receives data such as a second compression image from the image transmission device 100.

The image reception program 211 is a program to make a computer perform each processing, each procedure or each step of "processing," "procedure," or "step" with which the reception unit 21, the reception-side decompression unit 22, the error determination unit 23, the image generation unit 24 and the collation unit 25 are replaced. Further, an image reception calculation method is a method that is performed by the image reception program 211 being executed by the image reception device 200 being a computer. The image reception program 211 may be provided by being stored in a computer-readable storage medium, or may be provided as a program product.

*Explanation of Operations*

Figure 4:
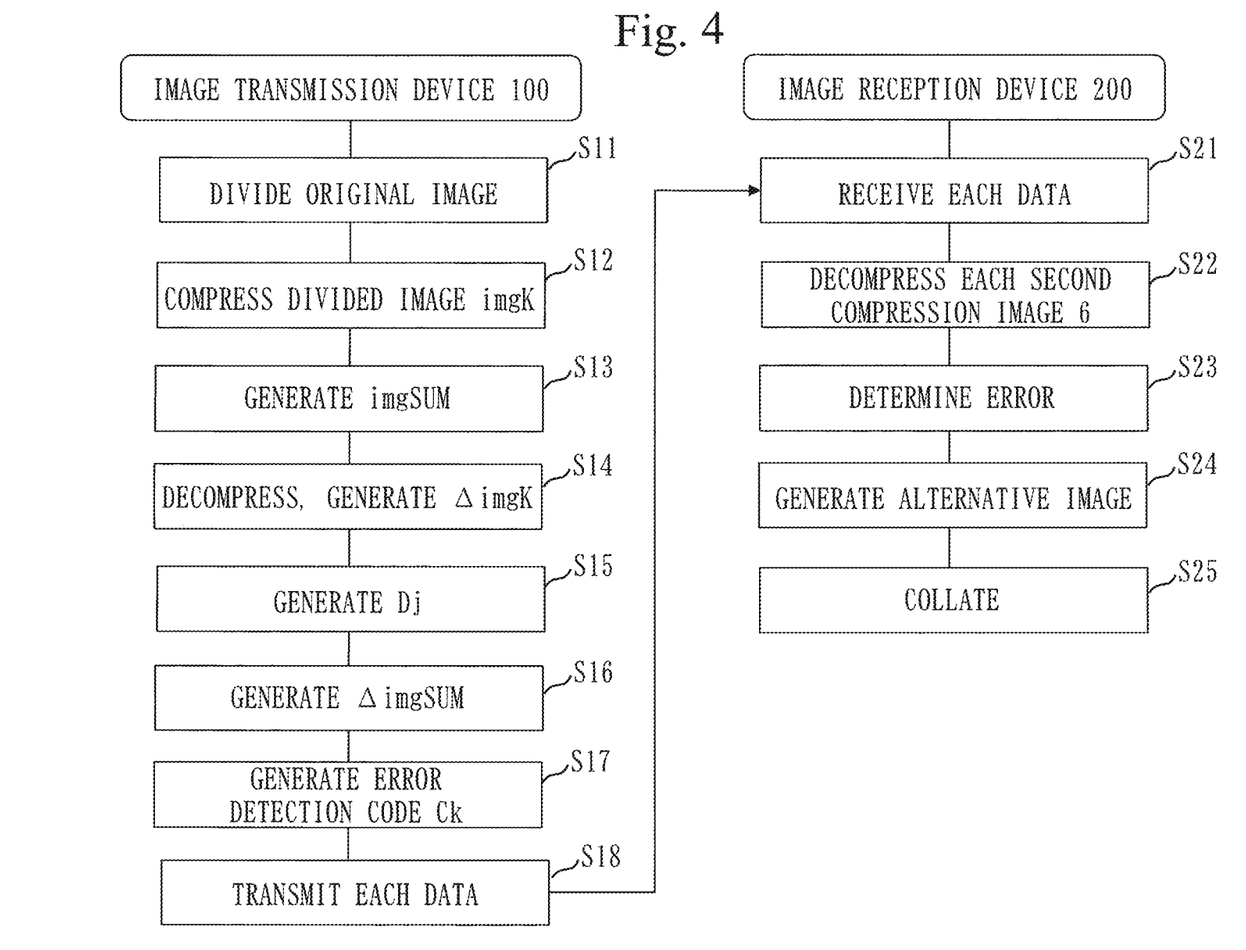
FIG. 4 is a diagram of the first embodiment, and is a flowchart illustrating operations of the image transmission device 100 and the image reception device 200.

FIG. 4 is a flowchart illustrating operations of the image transmission device 100 and the image reception device 200.

Figure 5:
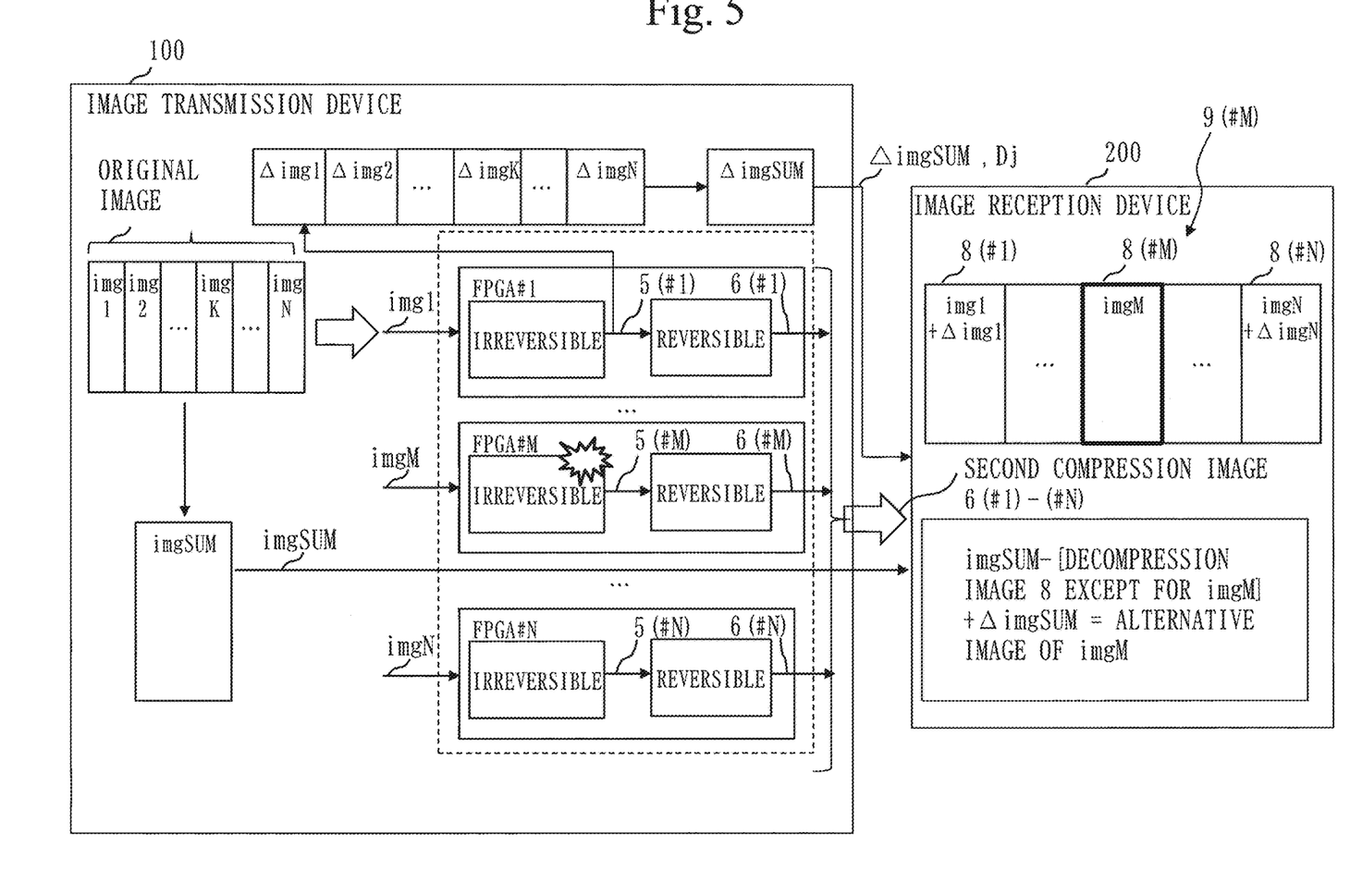
FIG. 5 is a diagram of the first embodiment, and is a diagram illustrating an overview of the operations of the image transmission device 100 and the image reception device 200.

FIG. 5 illustrates an overview of the operations of the image transmission device 100 and the image reception device 200.

With reference to FIG. 4 and FIG. 5, the operations of the image transmission device 100 and the image reception device 200 will be described. An operation procedure of the image transmission device 100 corresponds to an image transmission method. A program to realize the operations of the image transmission device 100 corresponds to an image transmission program 111. An operation procedure of the image reception device 200 corresponds to an image reception method. A program to realize the operations of the image reception device 200 corresponds to the image reception program 211.

The image transmission device 100 in the first embodiment decompresses data after irreversible compression, and takes the difference with an original image, in order to make a compression error image. On the other hand, the image transmission device 100 in a second embodiment to be described below decompresses data after reversible compression, and takes the difference with an original image, in order to make a compression error image. Hereinafter, the operations of the image transmission device 100 and the image reception device 200 will be described.

<Step S11: Division>

In a step S11, the division part 11 divides an original image into a plurality of divided images. When a divided image is denoted by an imgK (K=1, 2, . . . . N), the division unit 11 divides the original image into divided images from an img1 through an imgN. The division unit 11 inputs each of the img1 through the imgN into the FPGA #1 through the FPGA #N. An imgK is input into an FPGA #K.

<Step S12: Compression>

In a step S12, the irreversible compression units and the reversible compression units in each FPGA compress the imgKs. The irreversible compression unit 1-1 through the irreversible compression unit 1-N, and the reversible compression unit 2-1 through the reversible compression unit 2-N, in the FPGA #1 through the FPGA #N, form the compression unit 16. The compression unit 16 irreversibly compresses each imgK of the plurality of imgKs (K=1, 2, . . . N) into which an image of the original image has been divided, and generates first compression images 5 (#K). The compression unit 16 reversibly compress the first compression images 5 (#K), and generates second compression images 6 (#K). Specifically, as illustrated in FIG. 1, each FPGA compresses the imgKs. For example, in the FPGA #1, the irreversible compression unit 1-1 irreversibly compresses the img1 and generates a first compression image 5 (#1), and the reversible compression unit 2-1 reversibly compresses the first compression image 5 (#1) and generates a second compression image 6 (#1). The same applies to the other FPGAs.

<Step S13: Generation of imgSUM>

In a step S13, the division sum image generation unit 12 being the first generation unit aggregates pixel values at the same pixel positions in each imgK, and generates a division sum image including the pixel values aggregated for each pixel position. The division sum image is denoted by an imgSUM.

Specifically as follows: The img1 through the imgN are the same in size. The img1 through the imgN include Np pieces of pixels i (i=1, 2 . . . Np), from a pixel 1 through a pixel Np. A pixel i of an imgK is denoted by a pixel (K, i). Data in which pixels i of the img1 through the imgN are aggregated is denoted by P(i).

Hence it follows that:

$P(1)=\text{pixel}(1,1)+\text{pixel}(2,1)+ \ldots +\text{pixel}(N,1),$ $P(2)=\text{pixel}(1,2)+\text{pixel}(2,2)+ \ldots +\text{pixel}(N,2),$

. . . .

$P(i)=\text{pixel}(1,i)+\text{pixel}(2,i)+ \ldots +\text{pixel}(N,i),$

. . . .

$P(Np)=\text{pixel}(1,Np)+\text{pixel}(2,Np)+ \ldots +\text{pixel}(N,Np)$

An imgSUM is expressed by using P(1) through P(Np) as follows:

$\text{imgSUM}=\{P(1),P(2), \ldots ,P(i), \ldots ,P(Np)\}$

<Step S14: Decompression, Generation of ΔimgK>

In a step S14, the error sum image generation unit 13 being the second generation unit generates a ΔimgK being an error image. As a prerequisite for the error sum image generation unit 13 to generate the ΔimgK, a decompression unit 17 decompresses either each of the first compression images 5 (#K) or each of the second compression images 6 (#K), as decompression images 7 (#K). In the first embodiment, as illustrated in FIG. 1, the decompression unit 17 decompresses each of the first compression images 5 (#K). In the second embodiment, the decompression unit 17 decompresses each of the second compression images 6 (#K). In FIG. 5, decompression processing is omitted. In FIG. 1, a sub-decompression unit 3-1 through a sub-decompression unit 3-N in the FPGA #1 through the FPGA #N form the decompression unit 17. Specifically, as illustrated in FIG. 1, the sub-decompression units 3-K in the FPGAs #K decompress the first compression images 5 (#K). For example, in the FPGA #1, the sub-decompression unit 3-1 decompresses the first compression image 5 (#1), and generates a decompression image 7 (#1). The same applies to the other FPGAs.

The error sum image generation unit 13 generates a ΔimgK being an error image indicating a compression error of a decompression image 7 (#K) relative to the imgK. The error sum image generation unit 13 generates ΔimgK every the decompression image 7 (#K). Hereinafter, an error image is denoted by a ΔimgK. The error sum image generation unit 13 generates ΔimgKs from the imgKs and the decompression images 7 (#K). A description is provided by taking an img1 for example. By taking a case of K=1 for example, the error sum image generation unit 13 generates a Δimg1 from the img1 and the decompression image 7 (#1). The error sum image generation unit 13 may receive the img1 from the division unit 11, or from the FPGA #1. The error sum image generation unit 13 receives the decompression image 7 (#1) from the sub-decompression unit 3-1 of the FPGA #1.

When a decompression image 7 (#K) is not transmitted to the control FPGA #0 within a prescribed time due to abnormality, that is, when the control FPGA #0 does not receive a decompression image 7 (#K) within a prescribed time, the error sum image generation unit 13 treats a ΔimgK corresponding to the decompression image 7 (#K) that is not received, as having all pixel values being zero.

<Step S15: Generation of Dj>

In a step S15, the judgment unit 14 judges whether a compression error indicated by a ΔimgK being an error image exceeds a tolerable value TH, and generates judgment data Dj indicating a judgment result. The judgment data Dj is a number indicating K of the imgK. For example, when a compression error indicated by a ΔimgM (K=M) exceeds a tolerable value TH, the judgment data Dj={M} is obtained. Further, the judgment unit 14 judges whether a decompression image 7 (#K) is received from the sub-decompression unit 3-K or not, and generates judgment data Dj indicating the judgment result. For example, when a decompression image 7 (#M) is not received due to abnormality, the judgment unit 14 generates judgment data Dj being the judgment data Dj={M}.

<Step S16: Generation of ΔimgSUM>

In a step S16, the error sum image generation unit 13 aggregates pixel values at the same pixel positions in each ΔimgK, and generates a ΔimgSUM including the pixel values aggregated for each pixel position. Generation of a ΔimgSUM is the same as generation of an imgSUM described in the step S13. Specifically as follows.

The Δimg1 through the ΔimgN include Np pieces of pixels i (i=1, 2 ... Np) from the pixel 1 through the pixel Np, as with the img1 through the imgN. A pixel i of a ΔimgK is denoted by a pixel (K, i). Data wherein the pixels from the Δimg1 through the ΔimgN are aggregated is denoted by ΔP(i).

Hence it follows that:

$P(1)$=pixel$(1,1)$+pixel$(2,1)$+ ... +pixel$(N,1)$, $P(2)$=pixel$(1,2)$+pixel$(2,2)$+ ... +pixel$(N,2)$,

. . . .

$P(i)$=pixel$(1,i)$+pixel$(2,i)$+ ... +pixel$(N,i)$,

. . . .

$P(Np)$=pixel$(1,Np)$+pixel$(2,Np)$+ ... +pixel$(N,Np)$

ΔimgSUM is expressed by using ΔP(1) through ΔP(Np) as follows:

ΔimgSUM={ΔP(1),ΔP(2), ... ,ΔP(i), ... ,ΔP(Np)}

However, a ΔimgK being judged to exceed the tolerable value TH is not used for generation of the error sum image ΔimgSUM. For example, in a case of the judgment data Dj={M}, a ΔimgM is not used for generation of the ΔimgSUM.

It is not necessarily essential that a ΔimgK judged to exceed the tolerable value TH is not used for generation of the error sum image ΔimgSUM. Depending on the quality required for an alternative image, it is also applicable to use a ΔimgK judged to exceed the tolerable value TH for generation of the error sum image ΔimgSUM.

<Step S17: Generation of Ck>

The decompression unit 17 in the first embodiment decompresses each of the first compression images 5 (#K) as the decompression images 7 (#K). A code generation unit 18 generates error detection codes Ck of the first compression images 5 (#K) by using the first compression images 5 (#K). The transmission unit 15 transmits the error detection codes Ck. A description of necessity to transmit the error detection codes Ck will be provided in a step S25 below. Specifically as follows. In the first embodiment, as illustrated in FIG. 1, a sub-code generation unit 4-1 through the sub-code generation unit 4-N in the FPGA #1 through the FPGA #N form the code generation unit 18. As illustrated in FIG. 1, the sub-code generation units 4-K in the FPGAs #K generate the error detection codes Ck of the first compression images 5 (#K). By taking the FPGA #1 for example, the sub-code generation unit 4-1 generates an error detection code C1 of the first compression image 5 (#1). The same applies to the other FPGAs.

<Step S18: Transmission of Each Data>

The transmission unit 15 transmits the second compression images 6 (#K) for each imgK, the imgSUM, the ΔimgSUM, the judgment data Dj and the detection codes Ck.

<Step S21: Reception of Each Data>

In a step S21, the reception unit 21 of the image reception device 200 receives each of the second compression images 6 (#K), the imgSUM, the ΔimgSUM, the judgment data Dj and the detection codes Ck.

(1) Each of the second compression images 6 (#K) is each image obtained by reversibly compressing each of the first compression images 5 (#K), which have been obtained by irreversibly compressing each imgK of a plurality of imgKs divided from an original image.

(2) An imgSUM is an image, into which pixel values at the same pixel positions in each imgK are aggregated for each pixel position.

(3) A ΔimgSUM is an image, into which pixel values at the same pixel positions in ΔimgKs, each of which is an error image indicating a compression error of a decompression image 7 (#K) relative to an imgK, with respect to each of the decompression images 7 (#K) into which either each of the first compression images 5 (#K) or each of the second compression images 6 (#K) has been decompressed, are aggregated for each pixel position.

(4) Judgment data Dj is data indicating whether a compression error indicated by a ΔimgK exceeds a tolerable value TH.

(5) An error detection code Ck is an error detection code generated from the first compression images 5 (#K).

<Step S22: Decompression>

In a step S22, the reception-side decompression unit 22 decompresses the second compression images 6 (#K), and generates reception-side decompression images 8 (#K) being decompression images.

<Step S23: Error Determination>

In a step S23, the error determination unit 23 refers to the judgment data Dj, and determines an error decompression image 9 (#K), being a reception-side decompression image 8(#K) including an error. For example, in a case of the judgment data Dj={M}, as described in a step S15, the error determination unit 23 determines that an error exists in a reception-side decompression image 8 (#M). The error decompression image 9 (#K) is regarded as an error decompression image 9 (#M).

<Step S24: Generation of Alternative Image>

In a step S24, the image generation unit 24 generates an alternative image of the error decompression image 9 (#M). The image generation unit 24 generates an alternative image (#M) substituting for the error decompression image 9 (#M), by performing removal of data included in the reception-side decompression images 8 (#K) except for the error decompression image 9 (#M), and addition of data included in the ΔimgSUM, with respect to the imgSUM.

It follows that:

Alternative Image(#*M*)=imgSUM−[Reception-side Decompression Images 8 except for Reception-side Decompression Image 8(#*M*)]+ ΔimgSUM=img*M*+Δimg*M*   (Formula 1).

The meaning of (Formula 1) is as follows, specifically. The pixel number of the imgSUM, the pixel number of [Reception-side Decompression Images 8 except for Reception-side Decompression Image 8 (#M)], and the pixel number of the ΔimgSUM are the same. (Formula 1) is calculated for each pixel. By calculating for each pixel, Alternative Image (#M)=imgM+ΔimgM is obtained by Formula 1. The imgM is data included in the imgSUM, and the ΔimgM is data included in the ΔimgSUM.

However, in a case of the judgment data Dj={M}, substantially, it follows Alternative Image (#M)=imgM, and the alternative image coincides with an original image before irreversible compression. This is because, in the step S16, a ΔimgM exceeding a tolerable value TH is not used for generation of the ΔimgSUM, and it can be considered that a total pixel value of the ΔimgM is zero.

In a case of error detection by a step S25 as given below, since the ΔimgM is generally included in the ΔimgSUM, the alternative image (#M) is as described in Formula 1, and an alternative image including a compression error due to irreversible compression is obtained.

In the explanation above, it is described that the imgSUM and the ΔimgSUM are obtained by addition of each pixel. However, if it is possible to restore an alternative image from the imgSUM and the ΔimgSUM, it may be applicable to adopt XOR or a combination of addition and subtraction of each FPGA from the FPGA #1 through the FPGA #N. That is, it is possible to utilize an operation to meet the associative law, and to include an inverse operation.

<Step S25: Collation and Generation of Alternative Image>

In a step S25, a collation unit 25 collates an error detection code Ck with collation data Xk. In the first embodiment, the ΔimgSUM is generated by decompressing each of the first compression images 5 (#K). Therefore, in the image transmission device 100 of the first embodiment, for error detection after reversible compression, it is necessary to transmit an error detection code to the ground, and to check an error detection code in a ground-side system. The reception unit 21 receives error detection codes Ck (K=1, ... N) of the first compression images 5 (#K) generated by using the first compression images 5(#K). The collation unit 25 generates the collation data Xk to be collated with the error detection codes Ck (K=1, ... N) by using the second compression images 6 (#K) received by the reception unit 21. The collation unit 25 collates the error detection codes Ck with the collation data Xk, and determines a second compression image 6 (#K) including an error. For example, a second compression image 6 (#M) is determined to be the second compression image 6 (#K) including an error. The image generation unit 24 performs, with respect to the imgSUM, removal of data included in the reception-side decompression images 8 (#K) except for a reception-side decompression image 8 (#M) of the second compression image 6 (#M) determined to have an error, and addition of data included in the ΔimgSUM. By this execution, the image generation unit 24 generates an alternative image to substitute for the reception-side decompression image 8 (#M) of the second compression image 6 (#M) determined to include an error. Generation of the alternative image to substitute for the reception-side decompression image 8 (#M) by the image generation unit 24 is the same as generation of an alternative image by the image generation unit 24 in the step S24.

Effect of First Embodiment (1) By the image transmission device 100 in the first embodiment, when an error occurs in a decompression image decompressed on a reception side, it is possible to transmit data whereby a decompression image when an error does not occur or a restoration image equivalent to an original image before compression can be obtained.

(2) The image transmission device 100 in the first embodiment generates a ΔimgK being an error image from the first compression images 5 (#K), which have been obtained by irreversibly compressing divided images. Therefore, since operations for data decompression after irreversible compression are relatively easy, it is possible to suppress an operation scale of the FPGA #1 through the FPGA #N.

It is also applicable to perform compression processing of the imgSUM and the ΔimgSUM on the control FPGA #0.

Second Embodiment

With reference to FIG. 6 through FIG. 9, an image transmission device 100 and an image reception device 200 according to a second embodiment will be described.

Figure 6:
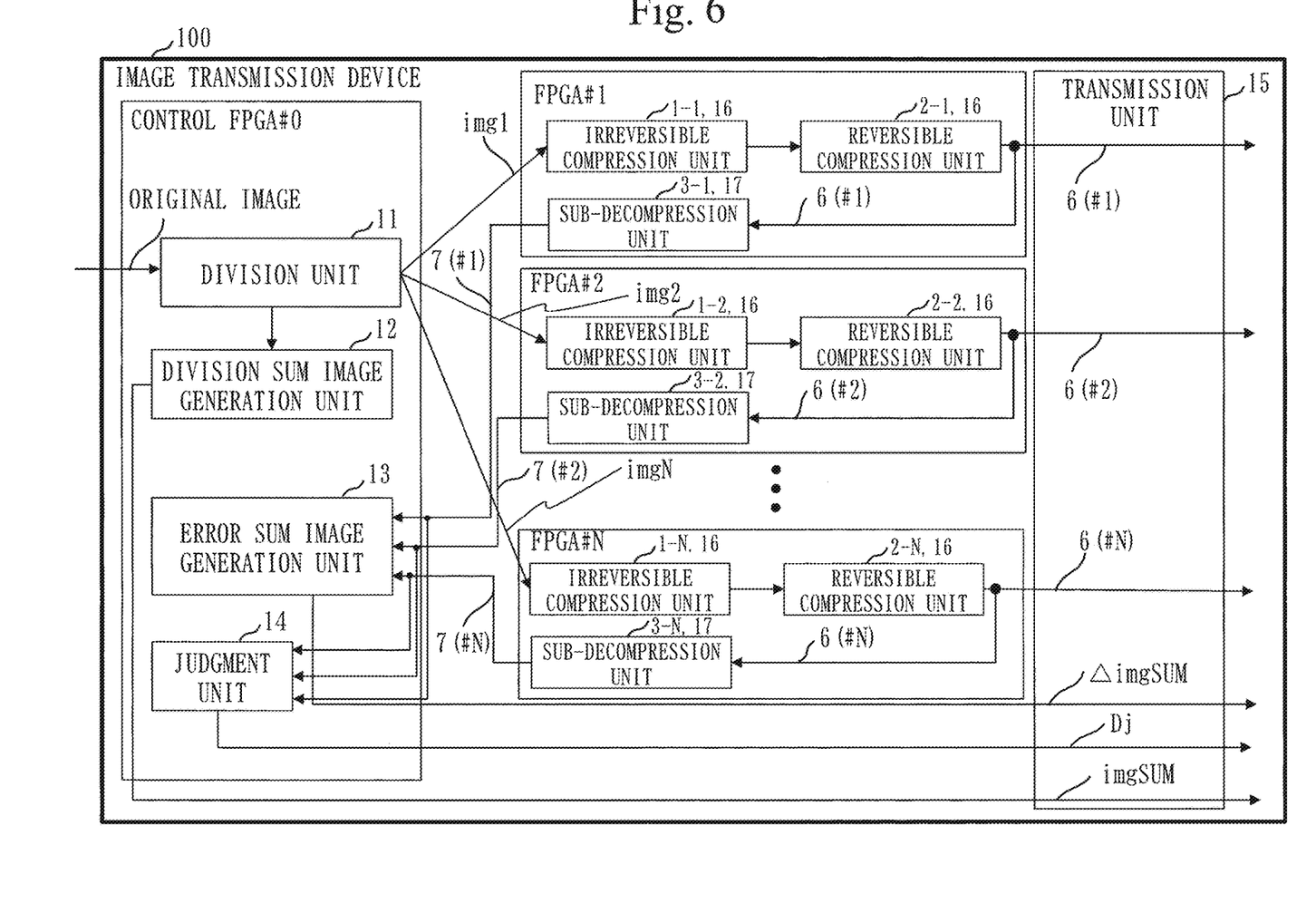
FIG. 6 is a diagram of a second embodiment, and is a diagram illustrating a hardware configuration of the image transmission device 100.

FIG. 6 illustrates a configuration of the image transmission device 100. In the image transmission device 100 according to the second embodiment, each FPGA does not include a sub-code generation unit, in opposition to the image transmission device 100 according to the first embodiment. This is because, in the second embodiment, in order to make AimgKs being compression error images, the image transmission device 100 decompresses second compression images 6 (#K) being images after reversible compression, and makes the AimgKs from the difference between decompression images 7 (#K) of the second compression images 6 (#K) and imgKs being divided images. The image transmission device 100 according to the second embodiment is the same as the image transmission device 100 according to the first embodiment except that each FPGA does not include a sub-code generation unit.

Figure 7:
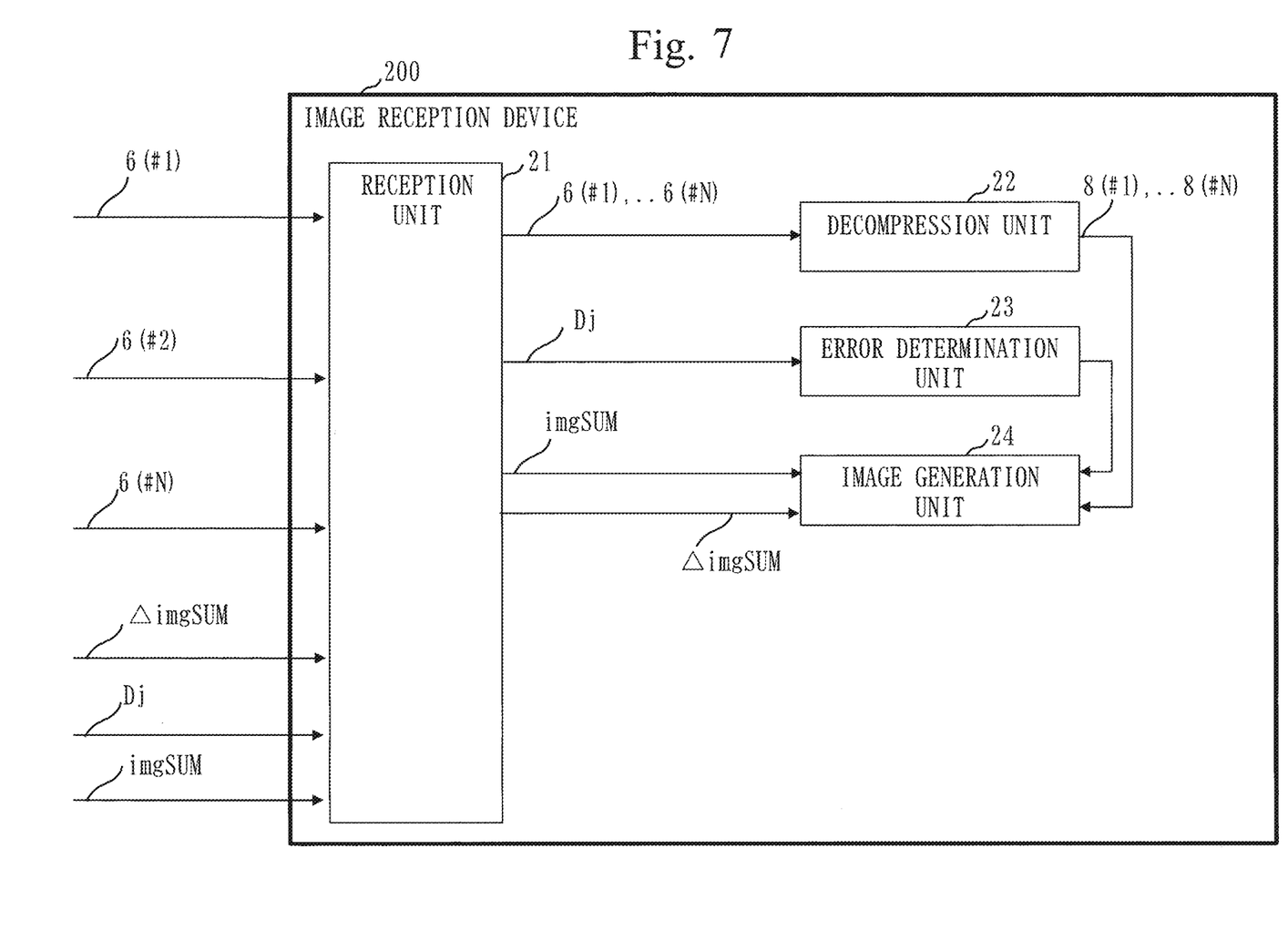
FIG. 7 is a diagram of the second embodiment, and is a diagram illustrating a functional configuration of an image reception device 200.

FIG. 7 illustrates a configuration of the image reception device 200. The image reception device 200 according to the second embodiment does not include a collation unit 25, in opposition to the image reception device 200 according to the first embodiment.

Figure 8:
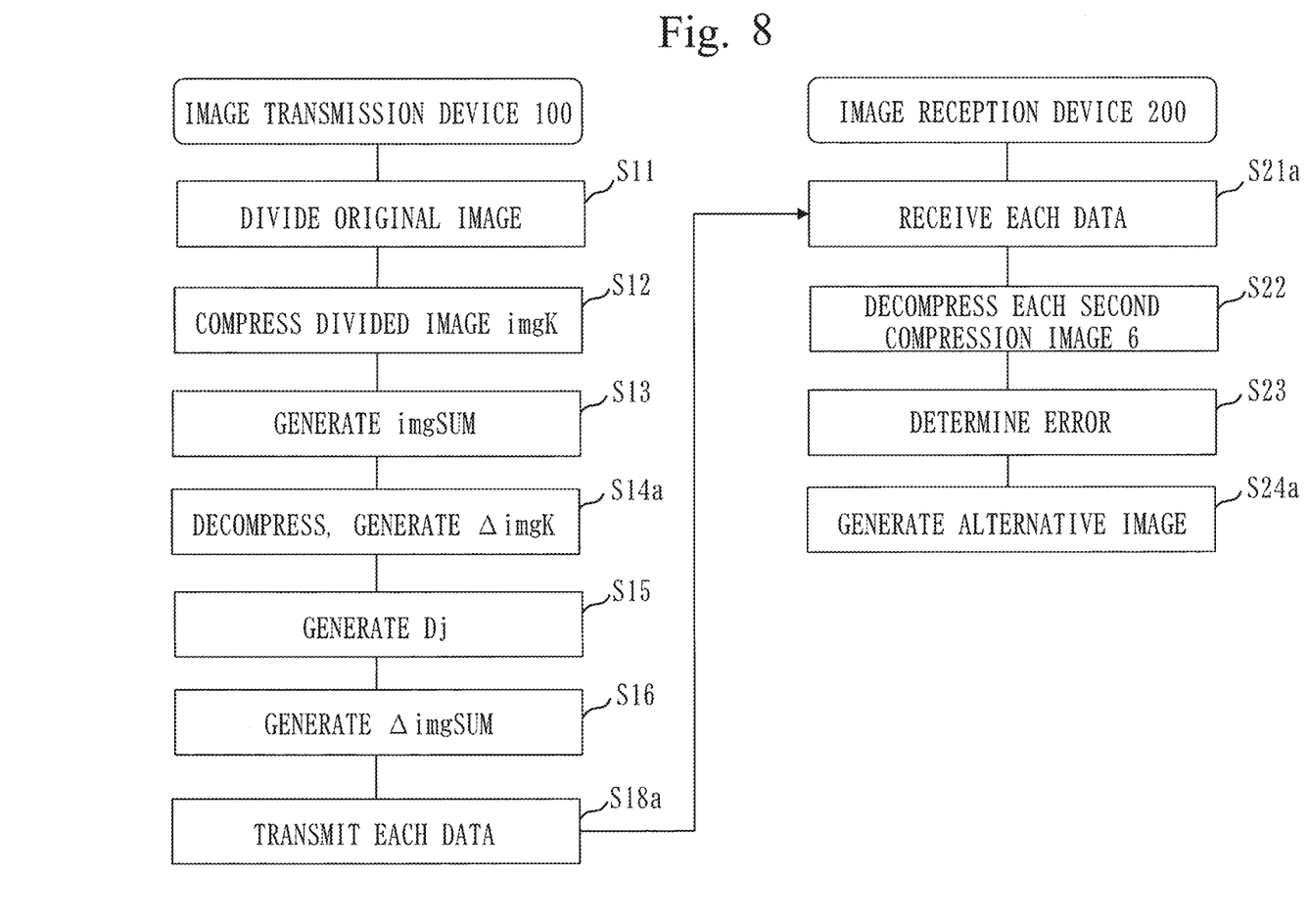
FIG. 8 is a diagram of the second embodiment, and is a flowchart illustrating operations of the image transmission device 100 and the image reception device 200.

FIG. 8 is a flowchart illustrating operations of the image transmission device 100 and the image reception device 200.

With reference to FIG. 8, operations of the image transmission device 100 and the image reception device 200 will be described. Steps different from those in the first embodiment will be described, and steps of the same processing as those in the first embodiment are denoted by the same step numbers. A description of the steps of the same processing is omitted.

<Step S11: Division>

In a step S11, the division unit 11 divides an original image into a plurality of divided images. The step S11 in the second embodiment is the same as the step S11 in the first embodiment.

<Step S12: Compression>

In a step S12, irreversible compression units and reversible compression units in each FPGA compress imgKs. The step S12 in the second embodiment is the same as the step S12 in the first embodiment.

<Step S13: Generation of imgSUM>

In a step S13, a division sum image generation unit 12 being a first generation unit generates an imgSUM being a division sum image. The step S13 in the second embodiment is the same as the step S13 in the first embodiment.

<Step S14a: Decompression, Generation of ΔimgSUM>

In a step S14a, an error sum image generation unit 13 being a second generation unit generates a ΔimgSUM being an error image. As a prerequisite for generating a ΔimgK by the error sum image generation unit 13, a decompression unit 17 decompresses either each of the first compression images 5 (#K) or each of the second compression images 6 (#K), as decompression images 7 (#K). In the second embodiment, as illustrated in FIG. 6, the decompression unit 17 decompresses each of second compression images 6 (#K). In FIG. 6, a sub-decompression unit 3-1 through a sub-decompression unit 3-N in an FPGA #1 through an FPGA #N form the decompression unit 17. Specifically, as illustrated in FIG. 6, sub-decompression units 3-K in FPGAs #K decompress second compression images 6 (#K). For instance, in a case of an FPGA #1, the sub-decompression unit 3-1 decompresses a second compression image 6 (#1), and generates a decompression image 7 (#1). The same applies to the other FPGAs.

The error sum image generation unit 13 generates a ΔimgK being an error image indicating a compression error of a decompression image 7 (#K) relative to an imgK, for each of the decompression images 7 (#K). The error sum image generation unit 13 generates ΔimgKs from the imgKs and the decompression images 7 (#K). A description will be provided by taking an img1 for example. For instance, in a case of K=1, the error sum image generation unit 13 generates a Δimg1 from the img1 and a decompression image 7 (#1). It may be applicable for the error sum image generation unit 13 to receive the img1 from the division unit 11, or from the FPGA #1. The error sum image generation unit 13 receives the decompression image 7 (#1) from the sub-decompression unit 3-1 in the FPGA #1.

<Step S15: Generation of Dj>

In a step S15, a judgment unit 14 judges whether a compression error indicated by the ΔimgK being an error image exceeds a tolerable value TH, and generates judgment data Dj indicating a judgment result. The step S15 in the second embodiment is the same as the step S15 in the first embodiment.

<Step S16: Generation of ΔimgSUM>

In a step S16, the error sum image generation unit 13 aggregates pixel values at the same pixel positions in each ΔimgK, and generates a ΔimgSUM including pixel values aggregated for each pixel position. The step S16 in the second embodiment is the same as the step S16 in the first embodiment.

<Step S18a: Transmission of Each Data>

A transmission unit 15 transmits the second compression images 6 (#K) for each imgK, the imgSUM, the ΔimgSUM and the judgment data Dj.

<Step S21a: Reception of Each Data>

In a step S21a, a reception unit 21 receives each of the second compression image 6 (#K), the imgSUM, the ΔimgSUM and the judgment data Dj. In opposition to the step S21 according to the first embodiment wherein an error detection code Ck is also received, in the step S21a, an error detection code Ck is not received.

<Step S22: Decompression>

In a step S22, a reception-side decompression unit 22 decompresses the second compression images 6(#K), and generates reception-side decompression images 8(#K). The step S22 in the second embodiment is the same as the step S22 in the first embodiment.

<Step S23: Error Determination>

In a step S23, an error determination unit 23 refers to the judgment data Dj, and determines an error decompression image 9 (#K) being a reception-side decompression image 8 (#K) including an error. The step S23 in the second embodiment is the same as the step S23 in the first embodiment.

<Step S24a: Generation of Alternative Image>

In a step S24a, an image generation unit 24 generates an alternative image of an error decompression image 9 (#M). The image generation unit 24 generates an alternative image (#M) substituting for the error decompression image 9 (#M) by performing removal of data included in the reception-side decompression images 8 (#K) except for the error decompression image 9 (#M), and addition of data included in the ΔimgSUM. It follows that:

Alternative Image(#M)=imgSUM−[Reception-side Decompression Images 8 except for Reception-Side Decompression Image 8(#M)]+
ΔimgSUM=imgM (Formula 2)

The meaning of (Formula 2) is different from the step S24 in the first embodiment in that the alternative image (#M) never includes a ΔimgM.

Effect of Second Embodiment (1) The image transmission device 100 in the second embodiment generates a ΔimgK being an error image from a second compression images 6 (#K) being a divided image having undergone irreversible compression and reversible compression. Therefore, by error judgment to generate judgment data Dj in the control FPGA #0, it is guaranteed that there is no error in all compression processing in the FPGA #1 through the FPGA #N. As a result, ground transmission of an error detection code and checking in a ground side system become unnecessary, and a configuration of an entire system is simplified.

(2) Since the image transmission device 100 in the second embodiment does not use a ΔimgK indicated by judgment data Dj for generation of a ΔimgSUM, it is possible to always restore an image equivalent to an original image before compression on the ground side.

<Supplement to Hardware Configuration>

Figure 9:
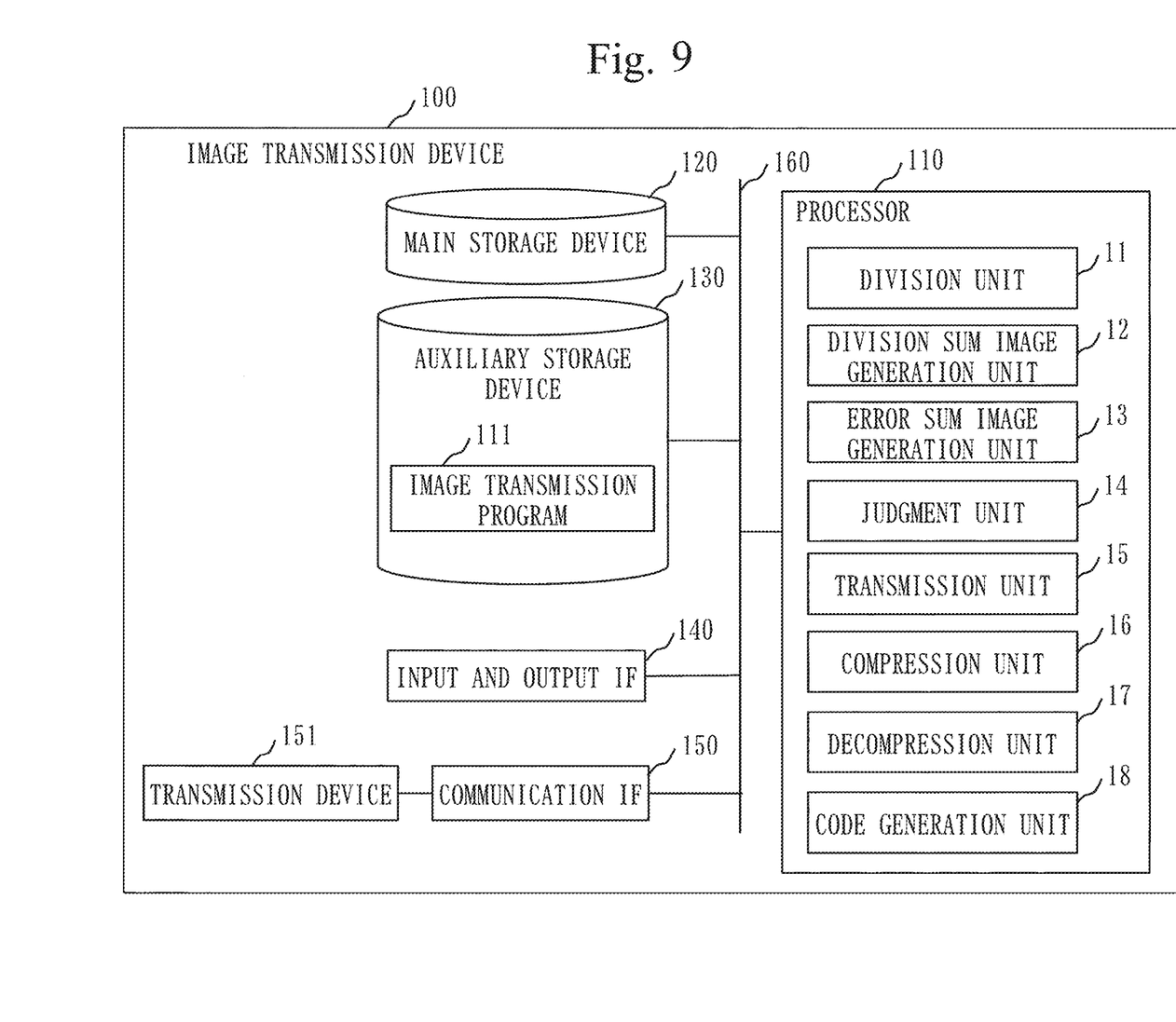
FIG. 9 is a diagram of the second embodiment, and is a diagram to supplement a hardware configuration of the image transmission device 100.

FIG. 9 illustrates a hardware configuration of the image transmission device 100 when the image transmission device 100 is realized by software. With reference to FIG. 9, an additional explanation is provided of a hardware configuration of the image transmission device 100. As illustrated in FIG. 9, the image transmission device 100 includes, as functional components, the division unit 11, the division sum image generation unit 12, the error sum image generation unit 13, the judgment unit 14, the transmission unit 15, the compression unit 16, the decompression unit 17 and the code generation unit 18. The transmission unit 15 communicates with the image reception device 200 by controlling a transmission device 151 via a communication IF 150.

As illustrated in FIG. 9, the image transmission device 100 is a computer. The image transmission device 100 includes a processor 110. Besides the processor 110, the image transmission device 100 includes other hardware components such as a main storage device 120, an auxiliary storage device 130, an input and output (IF 140 and the communication IF 150. The processor 110 is connected to other hardware components via a signal line 160, to control other hardware components. Functions of the division unit 11, the division sum image generation unit 12, the error sum image generation unit 13, the judgment unit 14, the transmission unit 15, the compression unit 16, the decompression unit 17 and the code generation unit 18 are realized by the image transmission program 111 stored in the auxiliary storage device 130. The image transmission program 111 is a program to realize the functions of the division unit 11, the division sum image generation unit 12, the error sum image generation unit 13, the judgment unit 14, the transmission unit 15, the compression unit 16, the decompression unit 17 and the code generation unit 18.

The processor 110 executes the image transmission program 111. The processor 110 is an integrated circuit (IC) to perform arithmetic processing. Specific examples of the processor 110 are the same as the processor 210. The input and output IF 140 is a port through which data is input and output from each device. The communication IF 150 is a communication port whereby a processor communicates with other devices. The transmission device 151 is connected to the communication IF 150. The image transmission program 111 is a program to make a computer perform each process, each procedure or each step of "processes," "procedures," or "steps," with which the division unit 11, the division sum image generation unit 12, the error sum image generation unit 13, the judgment unit 14, the transmission unit 15, the compression unit 16, the decompression unit 17 and the code generation unit 18 are replaced.

Further, an image transmission method is a method performed by the image transmission device 100 being a computer executing the image transmission program 111.

The image transmission program 111 may be stored in a computer-readable storage medium, or may be provided as a program product. In FIG. 1 and FIG. 6, with respect to the image transmission device 100, configurations using FPGAs are described. For the image transmission device 100, a large scale integration (LSI) such as an application specific standard produce (ASSP) or an application specific integrated circuit (ASIC) may be used. In FIG. 1 and FIG. 6, for the image transmission device 100, processing by hardware components is described. However, as illustrated in FIG. 9, the image transmission device 100 may be realized by software. Further, whereas the image reception device 200 is realized by software in FIG. 3, the image reception device 200 may be realized by hardware components. The control FPGA #0 and the FPGA #1 through FPGA #N illustrated in FIG. 1 and FIG. 6 are examples of realization of the image transmission device 100. For example, the FPGA #1 through the FPGA #N may be configured by a large-scale single FPGA. Otherwise, the FPGA #1 through the FPGA #N may be realized by a plurality of FPGAs smaller in number than N.

Each electronic circuit such as the processor 110 and the FPGAs is also referred to as processing circuitry. The image transmission device 100 and the image reception device 200 may be realized by processing circuitry.

It is described that the image transmission device 100 according to the first embodiment and the second embodiment is mounted on a spacecraft, and the image reception device 200 is installed in a ground station. However, use forms of the image transmission device 100 and the image reception device 200 are not limited to them.

The image transmission device 100 in the first embodiment and the second embodiment may aggregate pixel values at the same pixel positions in an imgSUM and a ΔimgSUM, and transmit the pixel values as imgSUM+ΔimgSUM.

Hereinabove, the embodiments of the present invention have been described, and two of these embodiments may be implemented in combination. Otherwise, one of these embodiments may be partially implemented. Otherwise, two and more of these embodiments may be partially implemented in combination. The present invention is not limited to these embodiments, and various modifications can be made as needed.

REFERENCE SIGNS LIST 1-1, 1-2, 1-N: irreversible compression unit; 2-1, 2-2, 2-N: reversible compression unit; 3-1, 3-2, 3-N: sub-decompression unit; 4-1, 4-2, 4-N: sub-code generation unit; 5: first compression image; 6: second compression image; 7: decompression image; 8: reception-side decompression image; 9: error decompression image; 11: division unit; 12: division sum image generation unit; 13: error sum image generation unit; 14: judgment unit; 15: transmission unit; 16: compression unit; 17: decompression unit; 18: code generation unit; 21: reception unit; 22: reception-side decompression unit; 23: error determination unit; 24: image generation unit; 25: collation unit; 100: image transmission device; 110: processor; 111: image transmission program; 120: main storage device; 130: auxiliary storage device; 140: input and output IF; 150: communication IF; 151: transmission device; 160: signal line; 200: image reception device; 210: processor; 211: image reception program; 220: main storage device; 230: auxiliary storage device; 240: input and output IF; 250: communication IF; 251: reception device; 260: signal line

The invention claimed is:

1. An image transmission device comprising:
processing circuitry to:
generate a first compression image by irreversibly compressing each divided image of a plurality of divided images obtained by dividing an image, and generate a second compression image by reversibly compressing the first compression image;
decompress either one of the first compression image and the second compression image, as a decompression image;
aggregate a pixel value at a same pixel position in the divided image, and generate a division sum image including a pixel value aggregated for the same pixel position;
generate, for the decompression image, an error image indicating a compression error of the decompression image relative to the divided image, aggregate a pixel value at a same pixel position in the error image, and generate an error sum image including the pixel value aggregated for the same pixel position;
judge whether the compression error indicated by the error image exceeds a tolerable value, and generate judgment data indicating a judgment result, and
transmit the second compression image for the divided image, the division sum image, the error sum image and the judgment data.

2. The image transmission device as defined in claim 1, wherein the processing circuitry:
decompresses the first compression image as the decompression image,
generates an error detection code of the first compression image by using the first compression image, and
transmits the error detection code.

3. The image transmission device as defined in claim 1, wherein the processing circuitry does not use the error image judged to exceed the tolerable value for generation of the error sum image.

4. The image transmission device as defined in claim 2, wherein the processing circuitry does not use the error image judged to exceed the tolerable value for generation of the error sum image.

5. An image reception device comprising:
processing circuitry to receive;
a second compression image obtained by reversibly compressing a first compression image, into which each divided image of a plurality of divided images obtained by dividing an image has been irreversibly compressed;
a division sum image wherein a pixel value at a same pixel position in the divided image is aggregated for the same pixel position;
an error sum image wherein, with respect to a decompression image which is obtained by decompressing either one of the first compression image and the second compression image, a pixel value at a same pixel position in an error image indicating a compression error of the decompression image relative to the divided image, is aggregated for the same pixel position; and
judgment data indicating whether the compression error indicated by the error image exceeds a tolerable value;
decompress the second compression image, and to generate a reception-side decompression image being a decompression image;

refer to the judgment data and to determine an error decompression image being the reception-side decompression image including an error, and generate an alternative image to substitute for the error decompression image, by performing on the division sum image, removal of data included in the reception-side decompression image except for the error decompression image, and addition of data included in the error sum image.

6. The image reception device as defined in claim 5,
wherein the error sum image is obtained by decompressing the first compression image,
and
wherein the processing circuitry:
  receives an error detection code of the first compression image, which has been generated by using the first compression image,
  generate collation data to be collated with the error detection code, by using the second compression image received, to collate the error detection code with the collation data, and to determine the second compression image including an error,
and
  generates an alternative image to substitute for a reception-side decompression image of the second compression image determined to include the error, by performing, on the division sum image, removal of data included in the reception-side decompression image except for the reception-side decompression image of the second compression image determined to include the error, and addition of data included in the error sum image.

7. A non-transitory computer-readable medium storing an image transmission program that cause a computer to execute:
  a compression process to generate a first compression image by irreversibly compressing each divided image of a plurality of divided images obtained by dividing an image, and to generate a second compression image by reversibly compressing the first compression image;
  a decompression process to decompress either one of the first compression image and the second compression image, as a decompression image;
  a first generation process to aggregate a pixel value at a same pixel position in the divided image, and to generate a division sum image including a pixel value aggregated for the same pixel position;
  a second generation process to generate, for the decompression image, an error image indicating a compression error of the decompression image relative to the each divided image, to aggregate a pixel value at a same pixel position in the error image, and to generate an error sum image including the pixel value aggregated for the same pixel position,
  a judgment process to judge whether the compression error indicated by the error image exceeds a tolerable value, and to generate judgment data indicating a judgment result, and
  a transmission process to transmit the second compression image for the divided image, the division sum image, the error sum image and the judgment data.

8. A non-transitory computer-readable medium storing an image reception program that cause a computer to execute:
a reception process to receive;
  a second compression image obtained by reversibly compressing a first compression image, into which each divided image of a plurality of divided images obtained by dividing an image has been irreversibly compressed,
  a division sum image wherein a pixel value at a same pixel position in the divided image is aggregated for the same pixel position;
  an error sum image wherein, with respect to a decompression image which is obtained by decompressing either one of the first compression image and the second compression image, a pixel value at a same pixel position in error image indicating a compression error of the decompression image relative to the divided image, is aggregated for the same pixel position; and
judgment data indicating whether the compression error indicated by the error image exceeds a tolerable value;
  a reception-side decompression process to decompress the second compression image, and to generate a reception-side decompression image being a decompression image;
an error determination process to refer to the judgment data, and to determine an error decompression image being the reception-side decompression image including an error, and
an image generation process to generate an alternative image to substitute for the error decompression image, by performing on the division sum image, removal of data included in the reception-side decompression image except for the error decompression image, and addition of data included in the error sum image.

* * * * *